Patented Sept. 7, 1943

2,328,940

UNITED STATES PATENT OFFICE 2,328,940

PREPARATION OF AMINO ACIDS

Witty Lysle Alderson, Jr., and Paul Rolland Austin, Wilmington, Del., assignors to E. I. du Pont de Nemours & Company, Wilmington, Del., a corporation of Delaware No Drawing. Application August 15, 1941, Serial No. 407,052

6 Claims. (Cl. 260—534)

This invention relates to the preparation of amino acids and more particularly to the preparation of alpha-amino-propionic acid (alpha-alanine) and nitrogen-substituted derivatives thereof.

This invention has as an object the provision of a new process for the preparation of alpha-alanine. A further object is the provision of a new process for the preparation of N-substituted alpha-alanine. Other objects will appear hereinafter.

These objects are accomplished by the following invention wherein an organic acid ester of alpha-hydroxypropionitrile, preferably a lower fatty acid ester is reacted with an ammonia type basic nitrogen compound having at least one hydrogen on the amino nitrogen all valences of which not satisfied by hydrogen are satisfied by aliphatic carbon, i. e. ammonia or a primary or secondary amine the nonhydrogen valences of which are attached to aliphatic carbon, and the reaction product is hydrolyzed to the amino acid. The basic ammonia type compound does not include amines containing free carboxyl or sulfo groups but includes metal salts thereof.

The preferred process of this invention is carried out as follows: An organic ester of alpha-hydroxypropionitrile is warmed with an excess of ammonia, or of an aliphatic amine which contains at least one amino hydrogen, for about 12 hours. The temperature at which the reaction is carried out depends mainly upon the nature of the amine. When one of the reactants is ammonia or a low boiling amine, such as methyl- or proplyamine, it is preferable to carry out the reaction in a sealed vessel at temperatures from 25° C. to 100° C. With a higher boiling amine, such as a butylamine, a sealed reaction vessel is not required and the temperature of the reaction may be chosen so as to correspond with the boiling point of the amine. The unreacted ammonia or amine is then removed by distillation, preferably under reduced pressure if the amine is high boiling, and the residue is hydrolyzed with aqueous hydrochloric acid or with aqueous alkali. The amino acid may be isolated from the hydrolysate by acidifying with an excess of hydrochloric acid if hydrolysis is carried out under alkaline conditions, and then evaporating to dryness and extracting the residue with warm alcohol which removes the amino acid hydrochloride from the inorganic salts which are present. The free amino acid can be liberated from its hydrochloride by removing the hydrochloric acid with an organic amine such as aniline or pyridine or with an inorganic base such as lime, soda or lead oxide.

The esters of alpha-hydroxypropionitrile used in this process may be prepared by the reaction of hydrogen cyanide with organic acid esters of vinyl alcohol or, less preferably, by treating alpha-hydroxypropionitrile with an organic acid halide in the presence of an acid acceptor such as dimethylaniline, pyridine or an alkali carbonate.

The more detailed practice of the invention is illustrated by the following examples, wherein parts given are by weight. There are of course many forms of the invention other than these specific embodiments.

Example I

Fifty parts of dl-alpha-acetoxypropionitrile is dissolved in 500 parts of liquid ammonia and this solution is heated to 25° C. overnight in a sealed autoclave. After allowing the excess ammonia to evaporate at room temperature the residual liquid is hydrolyzed by refluxing several hours with 250 parts of concentrated hydrochloric acid. The dark colored hydrolysate is filtered free of insoluble material and then evaporated to dryness, preferably under reduced pressure. dl-alpha-amino-propionic acid hydrochloride is separated from the ammonium chloride present in the dry residue by extracting the latter with warm alcohol, and then diluting the alcohol extract with aniline or pyridine and cooling the mixture in ice. The crude dl-alpha-alanine crystallizes from the cooled solution. When treated with benzoyl chloride the product is converted into dl-N-benzoyl-alpha-alanine which melts at 162° C. (E. Fischer, Ber. 32, 2454 (1895)).

Example II

Fifty parts of dl-alpha-acetoxypropionitrile is dissolved in 500 parts of methylamine and this solution is heated 12 hours at 50° C. in a sealed autoclave. After allowing the excess amine to evaporate, the residual liquid is hydrolyzed by refluxing for several hours with 250 parts of concentrated hydrochloric acid. The hydrolysate is filtered free of any insoluble material and then evaporated to dryness, preferably under reduced pressure. By extracting the dry residue with warm absolute alcohol the dl-alpha-N-methylaminopropionic acid hydrochloride is removed from the inorganic salts present. By concentrating and then cooling the alcohol extract the crystalline hydrochloride may be obtained which melts at 110° C. (Lindenberg, Jour. prakt. chem. 12, 246 (1875)).

dl-alpha-methylaminopropionic acid may be obtained by dissolving the hydrochloride in a small amount of cold absolute alcohol and then adding aniline which precipitates the free amino acid.

Any optically active or optically inactive organic acid ester of alpha-hydroxypropionitrile may be converted to alpha-alanine or its N-substituted derivatives by the process of this invention. The esters of the hydroxynitrile with lower aliphatic acids, i. e. those of from one to four carbon atoms, e. g. acetic, propionic and butyric acids, are preferred because they are more readily available, but organic acid esters in general may be employed, including the benzoate, stearate, crotonate, chloroacetate, trimethylacetate, laurate, methoxyacetate, meththioglycolate, phenylacetate and adipate.

All basic aliphatic, including aliphatic heterocyclic, amines which contain at least one amino hydrogen are operable, including benzylamine, ethylamine, diethylamine, piperidine, morpholine, β - phenylethylamine, ethanolamine, dodecylamine, sodium glycinate, hexamethylenediamine, sodium cystinate, allylamine. Amino acids, not being basic, are excluded but their salts are included. Aromatic amines apparently do not react readily with esters of alpha-acetoxypropionitrile to give products which on hydrolysis yield N-substituted alpha-aminopropionic acids. In general, it is preferred to use at least two moles of amine for each mole of nitrile. An excess of amine also functions as a solvent or diluent. If desired, an inert diluent such as alcohol, benzene or water may be used.

The temperature limits within which this process may be operated are determined by the thermal stability of the reactants and of the products formed. Esters of alpha-hydroxypropionitrile are unstable at temperatures in the neighborhood of 500° C., while alpha-alanine and N-substituted derivatives of alpha-aminopropionic acid deteriorate rapidly at temperatures above 300° C. A reaction temperature of about 25°–100° C. is the most desirable for avoiding side-reactions harmful to the purity of the desired product.

The process may be carried out under atmospheric or super-atmospheric pressures. Super-atmospheric pressures are generally required only when one of the reactants is a low boiling amine such as methyl-, ethyl- or propylamine. With higher boiling amines such as butyl- or amylamine atmospheric pressures are satisfactory.

The process is not limited to any specific reaction time as the period required for the operation of the process is determined by many factors such as temperature, concentration and the nature of the reactants. Usually from one to twelve hours is sufficient at reaction temperatures within the preferred range.

The hydrolysis of the reaction products of an aliphatic amine with an ester of alpha-hydroxypropionitrile may be accomplished under either acid or alkaline conditions. Hydrolysis with a volatile inorganic acid such as hydrochloric acid is preferred because an excess of the acid may be readily removed. Alkaline hydrolysis is not generally preferred because frequently it gives lower yields of amino acid, and because it necessitates additional manipulation during the isolation of the end-product.

The vessel in which the process is carried out must be resistant to the action of organic amines and ammonia as well as to the action of alkali and mineral acids. Furthermore it should be capable of maintaining and withstanding super-atmospheric pressures.

Alpha-alanine may be used as a source of nitrogen in the feeding of livestock and poultry and as an inhibitor of the corrosive action of water on iron or steel. N-substituted derivatives of alpha-aminopropionic acid are useful as stabilizers for solutions of diazonium salts and as intermediates in the preparation of surface active agents.

The process of the present invention may be readily controlled so as to decrease the formation of undesirable byproducts. The esters of alpha-hydroxypropionitrile are more stable than the hydroxynitrile itself which makes for convenience in reacting them. The process may be carried out in the presence of or in the absence of water.

The above description and examples are intended to be illustrative only. Any modification of or variation therefrom which conforms to the spirit of the invention is intended to be included within the scope of the claims.

What is claimed is:

1. Process for preparing alpha-alanine which comprises reacting alpha-acetoxypropionitrile at 25°–100° C. with ammonia and hydrolyzing the reaction product.

2. Process for preparing alpha-alanine which comprises reacting ammonia at 25°–100° C. with an ester of alpha-hydroxypropionitrile with a fatty acid of from one to four carbon atoms and hydrolyzing the reaction product.

3. Process for preparing alpha-alanine which comprises reacting an organic acid ester of alpha-hydroxypropionitrile with ammonia at 25°–100° C. and hydrolyzing the reaction product.

4. Process for preparing alpha-amino-propionic acids which comprises reacting an organic acid ester of alpha-hydroxypropionitrile with an ammonia type basic nitrogen compound having hydrogen on amino nitrogen, all remaining valences of which stem from aliphatic carbon, and thereafter hydrolyzing the reaction product.

5. Process for preparing alpha-N-methylaminopropionic acid, which comprises reacting an organic acid ester of alpha-hydroxypropionitrile with methylamine at 25–100° C., and hydrolyzing the reaction product.

6. Process for preparing alpha-N-dodecylaminopropionic acid, which comprises reacting an organic acid ester of alpha-hydroxypropionitrile with dodecylamine at 25–100° C., and hydrolyzing the reaction product.

WITTY LYSLE ALDERSON, JR.
PAUL ROLLAND AUSTIN.